Patented Sept. 7, 1943

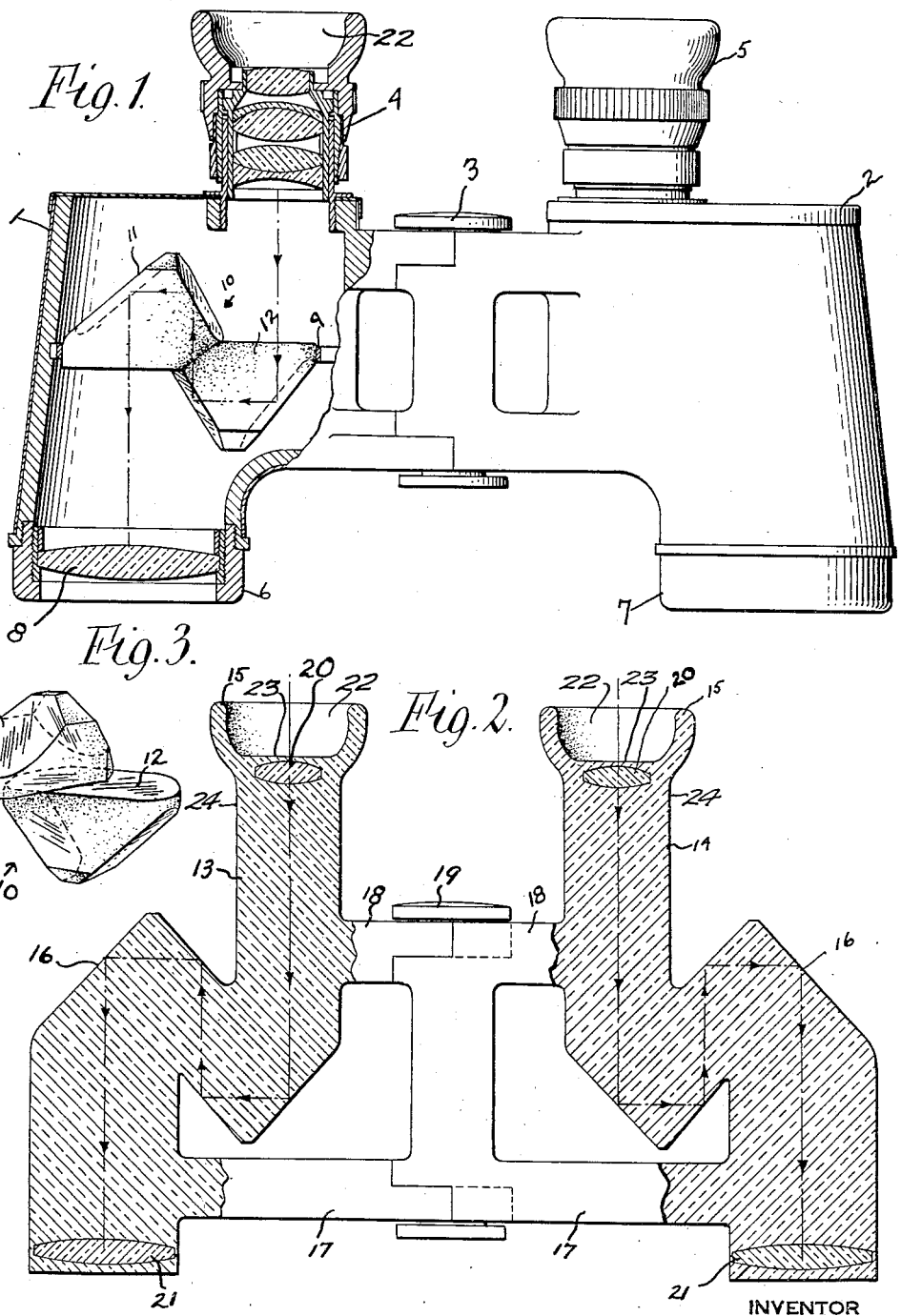

2,328,603

UNITED STATES PATENT OFFICE 2,328,603

OPTICAL INSTRUMENT

Alva H. Bennett, Kenmore, and Roger S. Estey, Buffalo, N. Y., assignors to Spencer Lens Company, Buffalo, N. Y., a corporation of New York Application October 25, 1940, Serial No. 362,720

9 Claims. (Cl. 88—33)

This invention relates to improvements in instruments having prismatic optical systems and to improved processes for making the same.

A principal object of the invention is to provide instruments having prismatic optical systems in which the prism members are integrally formed and to provide improved processes for making the same.

Another object of the invention is to provide an instrument having a prismatic optical system wherein the prismatic optical elements are formed of a single piece of material and to provide improved processes for making the same.

Another object of the invention is to provide instruments having prismatic optical systems in which the prismatic members and the holding or casing means are made of the same material and to provide improved processes for making the same.

Another object of the invention is to provide an instrument having a prismatic optical system wherein the casing or holding means is made of a suitable material and wherein some of the lenses of the optical system may be integrally formed in the said casing or holding means or wherein some of said lenses of the lens system may be integrally formed in the casing or holding means and other lenses of the lens system may be separate lenses positioned in the casing or holding means.

Another object of the invention is to provide simple, efficient and economical means for producing such instruments.

Other objects and advantages of the invention will become apparent from the following description taken in connection with the accompanying drawing. It will be apparent that many changes may be made in the arrangement of parts, details of construction, and steps of the processes without departing from the invention as set forth in the accompanying claims. It is therefore not desired to limit the invention to the details shown and described as the preferred forms only have been set forth by way of illustration.

Referring to the drawing:

Fig. 1 is a plan view partially in section of a binocular embodying the invention;

Fig. 2 is a plan view partially in section of another form of the invention; and Fig. 3 is a perspective view of the prismatic member shown in Fig. 1.

In the past the manufacture of prismatic optical systems has been very expensive due to the work involved in grinding and polishing the angular faces of the prismatic elements and the accuracy required on these faces. It is therefore one of the principal objects of this invention to provide prismatic optical systems containing prismatic members which are so constructed that they may be accurately molded from a transparent medium, thereby obviating the grinding of the prism faces and greatly reducing the cost of the manufacture of such elements.

Referring to the drawing wherein similar reference characters designate corresponding parts throughout, Fig. 1 shows a binocular comprising a pair of casings 1 and 2 pivotally connected by the pivot 3. To each of the casings 1 and 2 is secured the usual eyepiece members 4 and 5 which, as shown in section in Fig. 1, contain the usual focussing eyepiece lenses.

Each of the casings 1 and 2 also carries the cap members 6 and 7 each carrying an objective lens 8.

Supported in each of the casings 1 and 2 by the frames or rims 9 are the prismatic members 10. The prismatic members 10 are preferably made of an organic transparent plastic resin lens medium and may be molded from powdered unpolymerized plastic material and allowed to polymerize under pressure and heat. It may be made from sheet or rod stock of plastic material and molded to shape under heat and pressure.

This prismatic member 10 comprises two elements 11 and 12 which are set at an angle to one another so that the light will follow substantially the path shown in Fig. 1.

It will be seen that by molding the prismatic member 10 from a plastic resin as outlined above, the elements 11 and 12 will be more economically formed and also being formed integral, will be in desired relation with each other, thereby forming simple, efficient and economical prismatic elements for instruments of the type set forth. The prismatic faces of the elements 11 and 12 may also be formed in desired angular relation with each other to produce the desired prismatic effect in the instrument.

It is also pointed out that if desired after forming the prismatic member 10 of a transparent plastic resin as described above, the same may be coated with a transparent film such as a transparent enamel, varnish, wax, lacquer, liquid polish or other suitable substances or may be coated with a glass coating by spraying the glass coating thereon. This layer would tend to prevent any scratching or the like of the outer surface.

In the form of the invention shown in Fig. 2 the members 13 and 14 are each made of an organic transparent plastic lens medium. Each of these members 13 and 14 have formed integral therewith the eyepiece members 15, prismatic portions 16 and hinge portions 17 and 18. The hinge portions 17 and 18 are each formed with openings adapted to be aligned with each other and the pivot 19 is adapted to enter said aligned openings and pivotally connect the members 13 and 14. Also each of the members 13 and 14 have the glass lens elements 20 and 21 secured therein by molding the body around them during the forming of the said members 13 and 14.

The members 13 and 14 may be molded in any of the manners set forth above, that is, either from powder, sheet or rod stock.

It is pointed out that if desired the interior 22 of the eyecups 15 may be coated with an opaque material such as black paint, leaving the central transparent area 23 of a size appropriate to the optical design. This forms a diaphragm and prevents light rays, not a proper part of the optical image, from reaching the eye and confusing the vision.

Plastic resin is much lighter than glass lens material and it is not as frangible as glass. It may also be molded to good optical surfaces.

With the form of the invention shown in Fig. 2, it is not necessary to have the usual separate casings as shown in Fig. 1 but it is possible to apply an opaque coating or a scratch resistant coating 24 as described above to the outer surfaces of the members 13 and 14 to prevent the interfering effects of light which enters the instrument through its sides and the instrument as a consequence is lighter and smaller and therefore decidedly less costly to make and also is compact, light and inexpensive as compared with prior instruments of this character.

From the foregoing it will be seen that simple, efficient and economical means have been provided for obtaining all of the objects and advantages of the invention.

Having described our invention, we claim:

1. In a device of the character described, a molded integral optical member formed of a transparent plastic lens medium and comprising a plurality of integrally formed prism portions, said prism portions being connected adjacent an end of each of said prism portions and an eyepiece portion integral with said prism portions, said integral prism portions and eyepiece portion being simultaneously and integrally formed by molding said plastic lens medium under heat and pressure.

2. In a device of the character described, a pair of viewing members, each of said members being formed of a transparent plastic lens medium and comprising a plurality of prism portions, an integral connecting portion connecting said prism portions, an integral eyepiece portion, said integral prism, connecting and eyepiece portions being formed simultaneously by molding said plastic lens medium under heat and pressure, and a pivot member on each of said viewing members and pivotally connecting said viewing members.

3. In a device of the character described, a pair of viewing members, each of said members being formed of a transparent plastic lens medium and comprising a plurality of prism portions, an integral connecting portion connecting said prism portions, an integral eyepiece portion, said integral prism, connecting and eyepiece portions being formed simultaneously by molding said plastic lens medium under heat and pressure, a glass lens element secured in said eyepiece portion during said molding and a pivot member on each of said viewing members and pivotally connecting said viewing members.

4. In a device of the character described, a pair of viewing members, each of said members being formed of a transparent plastic lens medium and comprising a plurality of prism portions, an integral connecting portion connecting said prism portions, an integral eyepiece portion and an integral objective portion, said integral prism, connecting portion, eyepiece and objective portions being formed integrally and simultaneously by molding said plastic lens medium under heat and pressure, a glass lens element in said eyepiece portion and a glass lens element in said objective portion during the said molding, and an integral pivot portion on each of said viewing members and pivotally connecting said viewing members.

5. In a device of the character described, a molded integral optical member formed of a transparent plastic lens medium and comprising a plurality of integrally formed prism portions, said prism portions being connected and an eyepiece portion integral with said prism portions, said integral prism portions and eyepiece portion being simultaneously and integrally formed by molding said plastic lens medium under heat and pressure and a glass lens element secured in said eyepiece portion during said molding.

6. In a device of the character described, a molded integral optical member formed of a transparent plastic lens medium and comprising a plurality of integrally formed prism portions, said prism portions being connected and an eyepiece portion and an objective portion integral with said prism portions, said integral prism portions, eyepiece portion and objective portion being simultaneously and integrally formed by molding said plastic lens medium under heat and pressure.

7. In a device of the character described, a molded integral optical member formed of a transparent plastic lens medium and comprising a plurality of integrally formed prism portions, said prism portions being connected and an eyepiece portion and an objective portion integral with said prism portions, said integral prism portions, eyepiece portion and objective portion being simultaneously and integrally formed by molding said plastic lens medium under heat and pressure and glass lens elements secured in said eyepiece and objective portion during said molding.

8. In a device of the character described, a pair of viewing members, means for pivotally connecting said viewing members, each of said members comprising an eyepiece portion, an objective member, and a prism member comprising a plurality of prism portions, in optical alignment, said prism member being formed of a transparent plastic lens medium and consisting of a plurality of prism portions and an integral connecting portion connecting said prism portions, said integral prism and connecting portion being formed simultaneously by molding said transparent plastic lens medium under heat and pressure.

9. In a device of the character described, a viewing member, said member comprising an eyepiece portion, an objective member, and a prism member, said prism member comprising a plurality of prism portions in optical alignment, said prism member being formed of a transparent plastic lens medium and consisting of a plurality of prism portions and an integral connecting portion connecting said prism portions, said integral prism and connecting portion being formed simultaneously by molding said transparent plastic lens medium under heat and pressure.

ALVA H. BENNETT.
ROGER S. ESTEY.